US008629754B2

(12) United States Patent
Schafer et al.

(10) Patent No.: US 8,629,754 B2
(45) Date of Patent: Jan. 14, 2014

(54) AUDIBLE FEEDBACK FOR INPUT ACTIVATION OF A REMOTE CONTROL DEVICE

(75) Inventors: Adam Schafer, Littleton, CO (US); Joseph Tomko, Castle Rock, CO (US); Jeremy Mickelsen, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 951 days.

(21) Appl. No.: 12/638,247

(22) Filed: Dec. 15, 2009

(65) Prior Publication Data

US 2011/0140847 A1 Jun. 16, 2011

(51) Int. Cl.
*G09B 21/00* (2006.01)

(52) U.S. Cl.
USPC ......... 340/4.11; 340/4.1; 340/4.14; 340/7.51; 340/7.57

(58) Field of Classification Search
USPC ...................... 340/7.51, 4.1, 4.11, 4.14, 7.57, 340/384.1–404.3; 715/700–866; 348/14.05, 348/211.99, 734
See application file for complete search history.

(56) References Cited

U.S. PATENT DOCUMENTS

| | | | | | |
|---|---|---|---|---|---|
| 5,066,948 | A * | 11/1991 | Kaneko | ...................... | 340/12.18 |
| 5,345,226 | A * | 9/1994 | Rice et al. | .................... | 340/4.11 |
| 5,373,330 | A * | 12/1994 | Levine | .......................... | 348/734 |
| 6,130,624 | A * | 10/2000 | Guyer | ........................ | 340/12.55 |
| 6,803,857 | B1 * | 10/2004 | Uehara et al. | ............. | 340/12.31 |
| 7,167,083 | B2 * | 1/2007 | Giles | ........................ | 340/426.15 |
| 7,564,342 | B2 * | 7/2009 | Klein | ......................... | 340/425.5 |
| 8,074,178 | B2 * | 12/2011 | Hudson | ......................... | 715/764 |
| 2002/0130843 | A1 * | 9/2002 | Wada | ............................ | 345/168 |
| 2005/0212685 | A1 * | 9/2005 | Gordon | .................... | 340/825.19 |
| 2008/0055245 | A1 * | 3/2008 | Migliacio et al. | ............. | 345/158 |
| 2009/0153352 | A1 * | 6/2009 | Julio | ........................ | 340/825.22 |
| 2011/0018817 | A1 * | 1/2011 | Kryze et al. | .................. | 345/173 |
| 2011/0019105 | A1 * | 1/2011 | Austin | .......................... | 348/734 |

* cited by examiner

*Primary Examiner* — Steven Lim
*Assistant Examiner* — Ryan Sherwin
(74) *Attorney, Agent, or Firm* — Lowe Graham Jones PLLC

(57) ABSTRACT

A method of informing a user of an identity of an input of a remote control device is presented. In the method, user activation of one of the inputs of the remote control device is detected. An audible signal associated with the activated input is determined. Each of the inputs of the remote control device is associated with a unique one of a plurality of audible signals. The audible signal associated with the activated input is produced to inform the user of the identity of that input.

12 Claims, 8 Drawing Sheets

AUDIBLE FEEDBACK FOR INPUT ACTIVATION OF A REMOTE CONTROL DEVICE

BACKGROUND

Remote control devices, or “remote controls”, have long been standard accessories provided with many consumer electronic devices, such as televisions, television set-top boxes, and audio receivers, to allow users to control the electronic devices from beyond arm’s length. Remote control devices have long employed acoustic, infrared, and/or radio frequency (RF) signals to communicate with and control the electronic device of interest, thus typically allowing the user to be located remotely from the electronic device, such as across the same room, or even in a different room, from the device while retaining control thereof.

Generally, the electronic device being controlled provides some sort of visual feedback while the user is operating the remote control to inform the user that the electronic device is receiving the desired user input. For example, a user inputting digits into the remote control for a desired television channel may result in those digits being depicted on the associated television display. Similar, a change in television audio volume may result in a bar graph or similar representation on the television display indicating the current volume level relative to some maximum value. Generally, such feedback is provided at the electronic device being controlled in response to the command being received and executed at that device. Also, the remote control device generally exhibits lettering and other markings or physical features indicating the function associated with each key. Such markings are often difficult to discern in some environments, however, such as a dark room.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
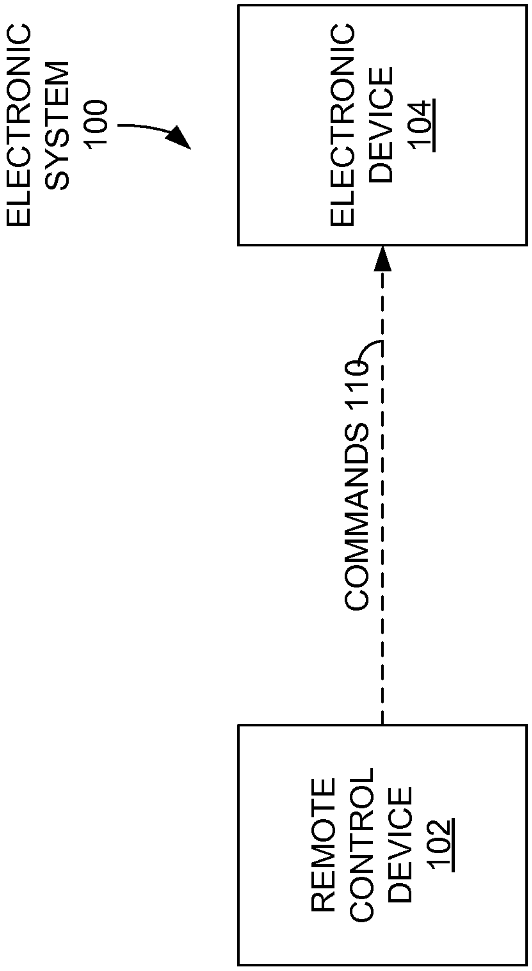
FIG. 1 is a simplified block diagram of an electronic system including a remote control device and associated electronic device according to an embodiment of the invention.

FIG. 1 is a simplified block diagram of an electronic system 100 according to an embodiment of the invention. The system 100 includes a remote control device 102 configured to control an associated electronic device 104 by way of commands 110 transmitted from the remote control device 102 to the electronic device 104. The remote control device 102 may be any remote control unit, such as a handheld device capable of transmitting commands by way of infrared (IR) signals, radio frequency (RF) signals, acoustic signals, and the like. The electronic device 104 may be any device capable of being controlled by way of the remote control device 102, such as a television set-top box, television, audio/video receiver, digital video recorder (DVR), video gaming system, compact disc (CD) player, digital video disk (DVD) player, computer, and the like.

Figure 2:
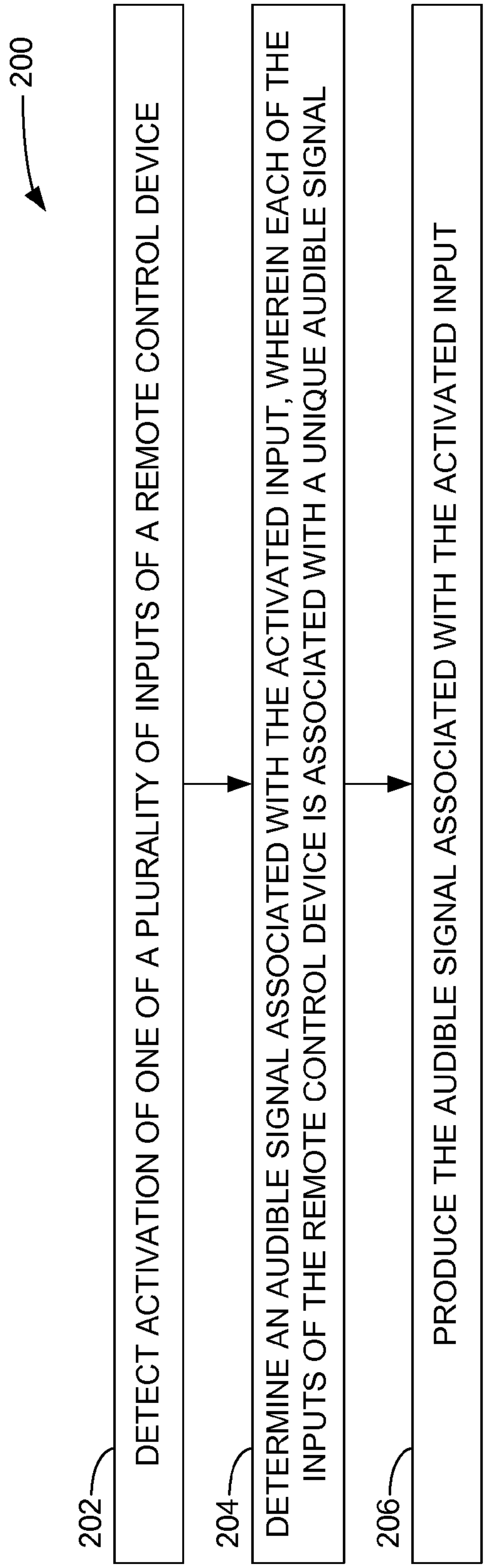
FIG. 2 is a flow diagram of a method according to an embodiment of the invention of informing a user of an identity of an input of a remote control device.

FIG. 2 presents a flow diagram of a method 200 according to an embodiment for informing a user of an identity of an input of a remote control device, such as the remote control device 102 of FIG. 1. In the method 200, user activation of one of a plurality of inputs of the remote control device 102 is detected (operation 202). An audible signal associated with the activated input is determined, wherein each of the inputs of the remote control device 102 is associated with a unique one of multiple audible signals (operation 204). The audible signal associated with the activated input is produced (operation 206). Depending on the embodiment, either the remote control device 102 or the corresponding electronic device 104 may determine and/or produce the audible signal. Also, user activation of an input of the remote control device 102 may or may not result in the actual issuance of a command to the electronic device 104 being controlled, depending on the particular implementation. In other implementations, one or more characteristics of the activation may control whether or not the audible signal is produced, as is described more fully below.

While the operations of FIG. 2 are depicted as being executed in a particular order, other orders of execution, including concurrent or overlapping execution of two or more operations, may be possible. In another embodiment, a computer-readable storage medium may have encoded thereon instructions for a processor or other control circuitry of the remote control device 102 and/or the electronic device 104 of FIG. 1 to implement the method 200.

As a result of at least some embodiments of the method 200, a user of the remote control device 102 may uniquely determine the identity of an input of the remote control device 102 by activating that input. By generating a unique audible signal associated with the input, the user may identify an input of the remote control device 102 during times when a clear view of markings on the remote control device 102 identifying the inputs is not possible, such as when the user is located in a darkened room, or if the user otherwise encounters difficulty in reading the markings. Further, generation of a unique audible signal for each remote control device 102 input may be more effective over providing distinctive surface features, such as "bumps", concave or convex surfaces, or other structural or physical differences for each input. Other advantages may be recognized from the various implementations of the invention discussed in greater detail below.

Figure 3A:
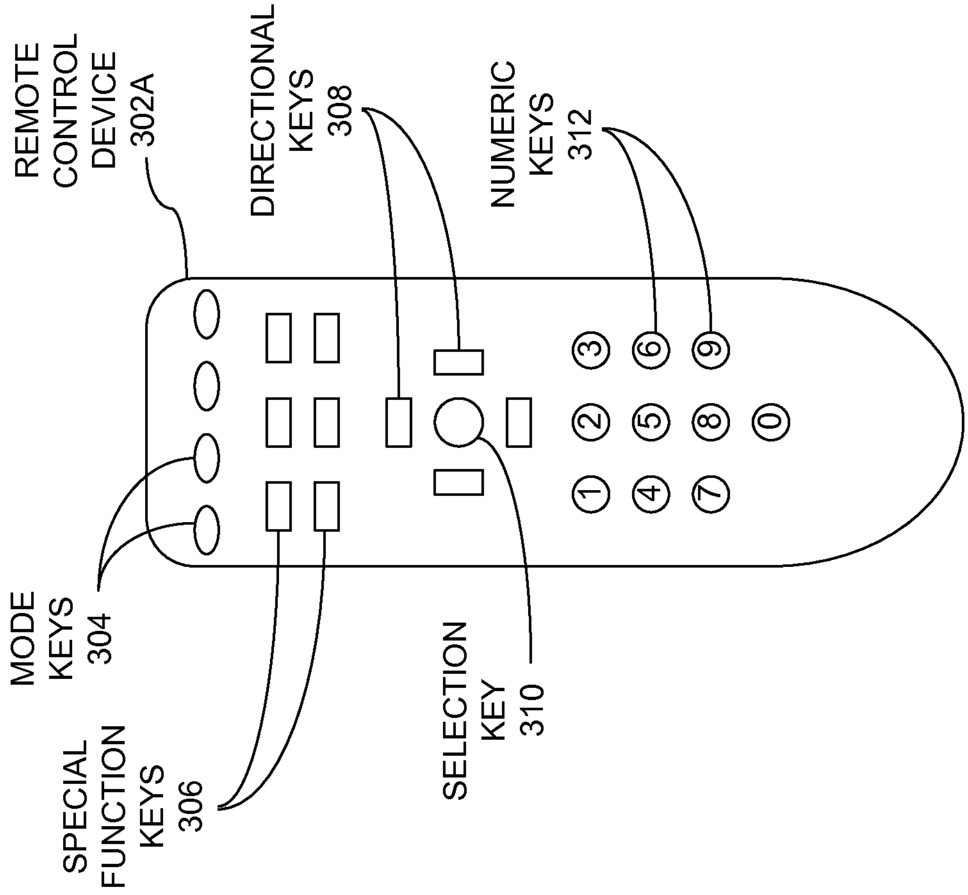
FIG. 3A is a top view of a remote control device employing directional keys according to an embodiment of the invention.

FIG. 3A is a top view of a remote control device 302A according to one implementation of the invention. Generally, the remote control device 302A provides a number of keys or buttons that may be depressed by the user to issue commands to an electronic device, such as a set-top box, television, DVR, CD player, DVD player, audio receiver, gaming system, desktop computer, or laptop computer. In the specific example of FIG. 3A, the remote control device 302A includes a set of mode keys 304, a set of special function keys 306, directional keys 308, a selection key 310, and numeric keys 312.

The mode keys 304 allow the remote control device 302A to operate with several different types of electronic devices. For example, each of the mode keys 304 may be associated with particular type of device, such as a set-top box, a television, an audio receiver, a DVD player, and so on. Thus, to place the remote control device 302A into an operational mode for a particular type of electronic device, the user merely presses the mode key 304 associated with that device. The user may then employ any of the remaining keys, such as the function keys 306 or the numeric keys 312, to control that device. To alter the operational mode of the remote control device 302A, the user may then merely depress another mode key 304, after which the user may utilize the various keys 306-312 of the remote control device 302A to control the device associated with that mode key 304.

The special function keys 306 of the remote control 302A allow the user to initiate specific functions or commands that may be executed by the electronic device being controlled. Examples of the function keys 306 may include, but are not limited to, a menu key, a last-channel key, channel-up and channel-down keys, volume-up and volume-down keys, fast-forward and reverse keys, a pause key, a play key, and an audio mute key. Some keys may perform different operations depending on the particular operational mode selected for the remote control 302A via the mode keys 304.

To access various graphical items and associated functions presented in an on-screen menu, the directional keys 308, such as up, down, left, and right keys, allow the user to navigate the menu. Typically, the directional keys 308 change a highlighted graphical element of the menu that may be subsequently activated via the selection key 310. Use of the selection key 310 thus initiates a function or command represented by the selected graphical element.

The numeric keys 312 facilitate direct user entry of numbers, such as programming channel numbers, thus facilitating quick access to a desired channel. Other uses for direct entry of numbers (or, more generally, alphanumeric characters) via the numeric keys 312 may be employed in other implementations.

Figure 3B:
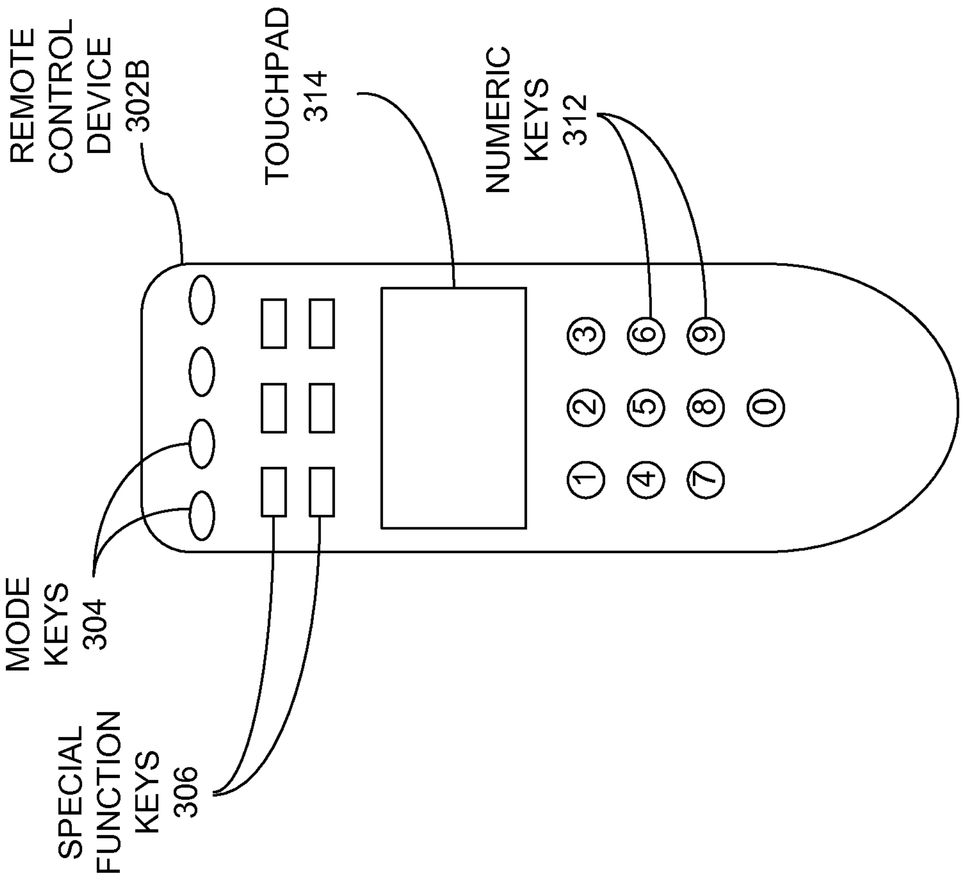
FIG. 3B is a top view of a remote control device employing a touchpad according to an embodiment of the invention.

FIG. 3B provides a top view of another remote control device 302B. In this case, a two-dimensional touchpad 314 replaces the directional keys 308 and the selection key 310 of the first remote control device 302A. By dragging a finger or a stylus across the surface of the touchpad 314, the user may navigate an on-screen menu to highlight a graphical item of choice. The user may then select the highlighted item to initiate a command for the corresponding electronic device by tapping the touchpad 314, by depressing a key (such as one of the function keys 306), or by some other user interaction with the remote control device 302B.

With respect to each of the remote control devices 302A, 302B (collectively, 302), a unique audible signal is generated for each of the keys 304-312 and touchpad 314 so that the user may identify the particular key, touchpad, or other input device being activated by the user. Other inputs or input components, such as joysticks, levers, switches, and the like, may be identified in such a manner in other remote control devices. Other possible types of input components that a user may activate include a free-space position-sensing system, such as a gyroscope or accelerometer, or similar device allowing the user's movement of the remote control device to be interpreted as user input.

Figure 4:
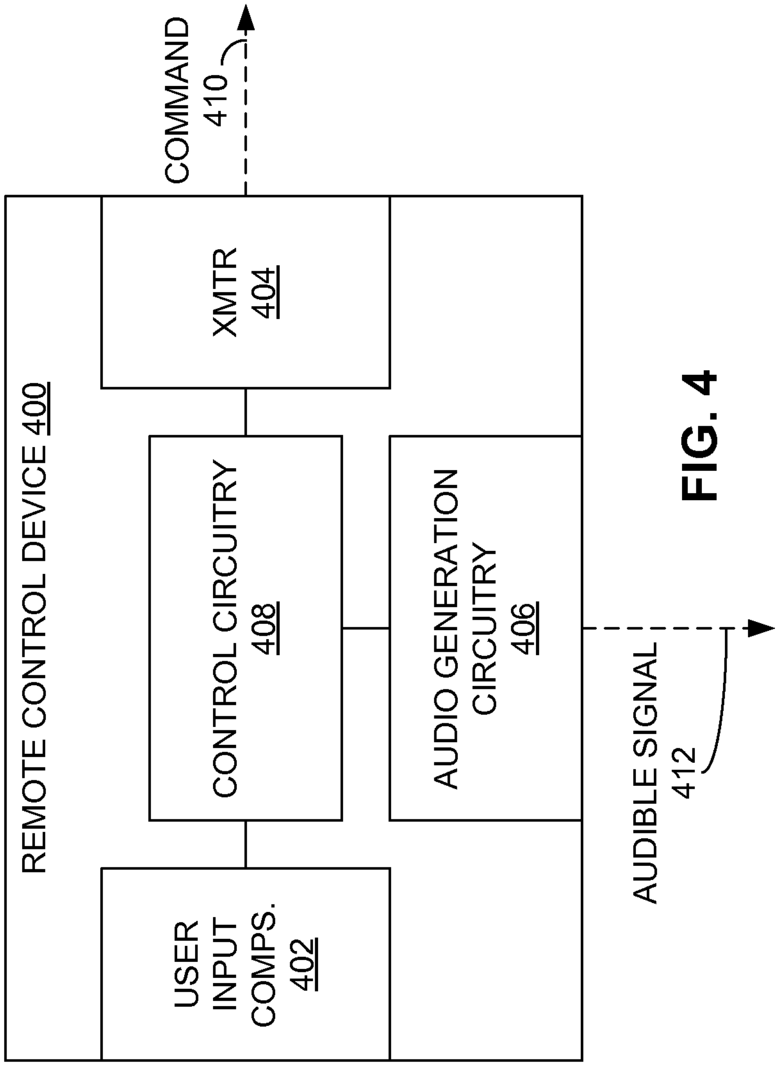
FIG. 4 is a block diagram of a remote control device according to an embodiment of the invention.

FIG. 4 provides a block diagram of a remote control device 400 that includes user input components 402, a transmitter 404, audio generation circuitry 406, and control circuitry 408. Other components, such as a remote control body and a battery or other power supply, may also be included in the remote control device 400, but such components are not explicitly shown or discussed herein to facilitate the following discussion. As with the remote control devices 302 discussed above, the remote control device 400 is adapted to control an electronic device configured to receive and execute the commands issued by the remote control device 400. Examples of such devices include entertainment components, such as set-top boxes, televisions, audio receivers, CD players, DVD players, and DVRs, as well as other electronic products, such as desktop and laptop computers.

Each of the user input components 402 is associated with at least one command for an electronic device to be controlled by the remote control device 400. Examples of the user input components 402 include, but are not limited to, the various keys 304-312 of the remote control device 302A of FIG. 3A, the touchpad 314 of the remote control device 302B of FIG. 3B, joysticks, levers, switches, gyroscopes, accelerometers, and other input devices.

The transmitter 404 is configured to transmit commands 410 to the corresponding electronic device to be controlled. The transmitter 404 may be an infrared (IR) signal transmitter, a radio frequency (RF) signal transmitter, an acoustic signal transmitter, or any other transmitter capable of transmitting commands 410 in a wired or wireless fashion to the electronic device.

The audio generation circuit 406 of the remote control 400 is configured to generate audible signals 412 for a user. For example, the audio generation circuit 406 may include a speaker, possibly driven with amplification circuitry. In one embodiment, the audio generation circuit 406 may further include means for generating the audible waveform, such as a pulse-width-modulation (PWM) circuit or component. Other components or devices capable of facilitating the generation of the audible signal 412 for user notification may be incorporated in the audio generation circuitry 406.

The control circuitry 408 is coupled with the user input components 402, the transmitter 404, and the audio generation circuitry 406. The control circuitry 408 may include one or more processors, such as a microprocessor, microcontroller, or digital signal processor (DSP), configured to execute instructions directing the processor to perform the functions discussed more fully below. The control circuitry 408 may also include memory or data storage adapted to contain such instructions. In another implementation, the control circuitry 408 may be strictly hardware-based logic, or may include a combination of hardware, firmware, and/or software elements.

In operation, the control circuitry 408 is configured to detect activation of one of the user input components 402. Generally, activation of a user input component 402 is initiated by a user depressing a key 304-312, contacting a touchpad 314, or otherwise engaging one of the user input components. As is discussed in greater detail below, based on one or more characteristics of the activation of the input component 402, the control circuitry 408 may determine an audible signal 412 that is associated with the activated input component 402 and transfer the audible signal 412 to the audio generation circuitry 406 for presentation to the user, to generate a command 410 based on the activated component 402 and transfer the command 410 to the transmitter 404 for transmission to the target electronic device, or some combination thereof. In one example, the control circuitry 408 may determine the length of time a user continuously depresses a key 304-312 or contacts the touchpad 314, which the control circuitry 108 employs to determine the appropriate response.

Figure 5A:
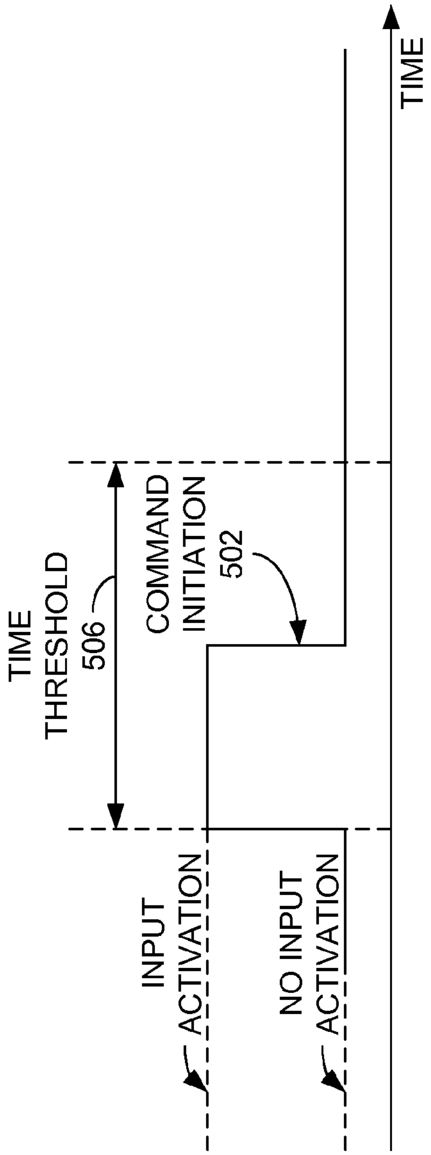
FIG. 5A is a timing diagram of a command initiation at the remote control device of FIG. 4 according to an embodiment of the invention.
Figure 5B:
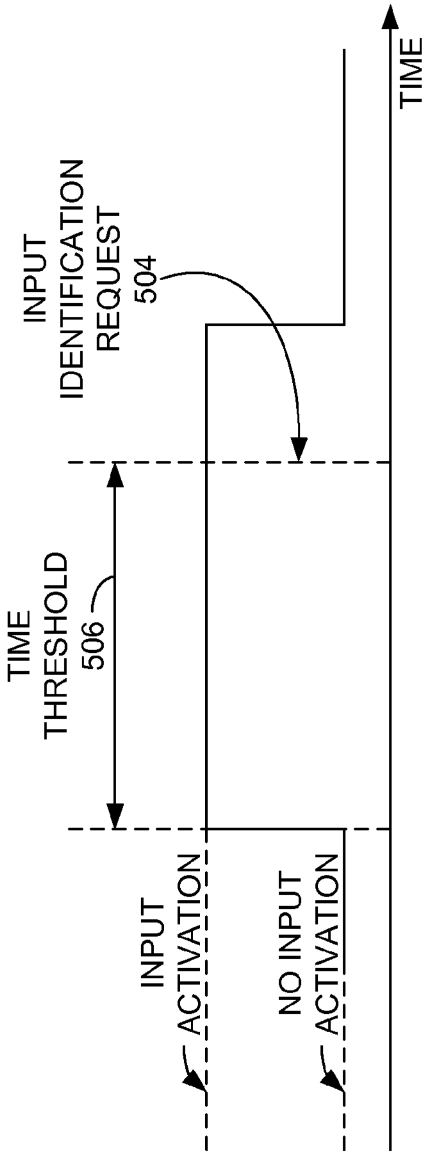
FIG. 5B is a timing diagram of an input identification request at the remote control device of FIG. 4 according to an embodiment of the invention.

FIGS. 5A and 5B present two different circumstances in which the period of time during which an input component 402 is activated result in different responses from the control circuitry 408. For example, FIG. 5A shows an example in which an input component 402 is activated continuously for less than a time threshold 506. As a result, the control circuitry 408 interprets the deactivation of the input component 402 as a command initiation 502, whereupon the control circuitry 408 generates a command 410 associated with the activated component 402, and transfers the command 410 to the transmitter 404 for transmission to the electronic device associated with the remote control device 400. In one example, the time threshold 506 may be approximately one second.

In contrast to FIG. 5A, FIG. 5B exemplifies a situation in which the user continuously activates the input component 402 for longer than the time threshold 506. In this scenario, once the time threshold 506 has been crossed, the control circuitry 408 interprets the activation as an input identification request 504. In response, the control circuitry 408 determines the audible signal 412 that is associated with the activated input component 402, and transfers the audible signal 412 to the audio generation circuitry 406 for presentation to the user.

Thus, in the implementation of FIGS. 5A and 5B, a relatively short, momentary activation of a key or other input component 402, such as a key press, causes an activation of the function 410 associated with that component 402, while a longer activation exceeding the time threshold 506 causes an audible signal 412 identifying the component 402 to be produced. In other implementations, variations from the embodiment of FIGS. 5A and 5B may be employed. For example, the audible signal 412 may be generated regardless of whether the time threshold 506 has been exceeded, while the command initiation 502 occurs only if the activation falls short of the threshold 506. In another implementation, the audible signal 412 may be determined and transferred if the threshold 506 is not met, while the command 410 may be generated and transferred if the threshold 506 is attained, thus essentially performing the reverse of the protocol indicated in FIGS. 5A and 5B. In yet other examples, other aspects of the input component activation 402, such as the number of times the component 402 is activated within a predetermined time period, may be employed in lieu of the continuous amount of time the component 403 is activated in order to determine whether the associated command 410 is generated or the corresponding audible signal 412 is transmitted.

The audible signal 412 associated with each of the input components 402 may take any of a number of forms to allow a user to discern one input component 402, such as a key or button, from another. For example, each audible signal 412 may be a single frequency or tone of limited duration, wherein each signal 412 is distinguished from another by its frequency. In other cases, each audible signal 412 may include multiple frequencies, wherein the particular mix of frequencies is different for each of the input components 402. In yet other implementations, the length in time of each audible signal 412, the volume of the audible signal 412, or the number of separate audible bursts or pulses of the signal 412, may be serve as distinguishing characteristics. Further, any two or more of these factors may be combined to further distinguish one audible signal over another. Other ways of distinguishing the signals 412, such as varying the frequency or tone provided by a signal, providing a series of different tones, and other distinguishing factors, may be employed in other implementations.

In some implementations, the scheme of FIGS. 5A and 5B may be enhanced to further indicate a situation in which an input component 402 is pressed for an extended period of time, such as five seconds. This situation may occur if the remote control device 400 is located underneath or behind a sofa cushion or other object, potentially out of view of the user. In that case, the control circuitry 408 may be configured to select an audible signal 412 different from other signals 412, such as a prolonged tone or series of tones, to alert the user to the location of the remote control device 400.

The assignment of various audible signals 412 to corresponding input components 402 may be determined in more than one way. For one, each audible signal 412 may be statically associated with a specific input component 402 in the control circuitry 408. In one particular implementation, the audible signals 412 may be logically related to the input components 402 in some fashion. For example, the components 402 toward the lower physical end of the remote control device 400, such as the numeric keys 312, may be associated with audible signals 412 of lower relative audio frequencies, while those at the opposite end, such as the mode keys 304, may be exhibited by signals 412 of higher frequencies. Similarly, components 402 toward the left end of the remote control 400 may be associated with audible signals 412 of relatively lower volume, while those at the right end correspond with higher-volume signals 412. Other ways of associating some characteristic of the audible signals 412, such as the length of the tones, or the number of tone bursts produced, with the physical location of the input components 402 on the remote control 400 may be undertaken in further implementations.

In yet another embodiment, the audible signals 412 may be associated with the input components 402 in such a manner that adjacent components 402 would be associated with audible signals 412 exhibiting significantly different audio characteristics, such as frequency, volume, length in time, and other factors. Such an embodiment may aid the user in distinguishing input components 402 located closely to each other.

Aside from allowing the remote control 400 to statically associate each input component 402 with a specific audible signal 412, the remote control 400 may allow a user to associate each possible audible signal 412 with the component

402 of the user's choice. To this end, the remote control 400 may allow the use to press one or more components 402, or a sequence thereof, to place the remote control 400 in a programming mode in which the user may select a preexisting audible signal 412 for each of the components 402. The user may then exit the programming mode by employing another activation of one or more components 402, or by way of a timeout period tracked by the remote control device 400. In addition, the remote control device 400 may be placed into two separate operating configurations: one in which the audible signals 412 are enabled, and another in which the audible signals 412 are disabled while the user is employing the remote control 400 to control an electronic device.

In some arrangements, one or more of the components may be associated with more than one audible signal 412. For example, for those input components 402 that are associated with a different function or command based on the operational mode of the remote control 400, as determined by the mode keys 304, different audible signals 412 may be associated with the same component 402 depending on the operational mode. For example, a particular function key 306 may be associated with one audible signal 412 when the remote control device 400 is operating in the television mode, while that same key 306 may correspond with a different audible signal 412 during a set-top box mode.

With respect to the touchpad 314 of FIG. 3B, more than one audible signal 412 may be associated with the touchpad 314 to indicate to the user not only that the touchpad 314 is being contacted, but also to identify which portion of the touchpad 314 is involved. For example, the vertical position of the contact made on the touchpad 314 may be associated with the frequency of the audible signal 412, while the horizontal position is reflected in the volume of the audible signal 412. Other ways of relating the two-dimensional location of contact on the touchpad 314 with characteristics of the audible signal 412 may be utilized in other implementations.

In a particular arrangement of the remote control device 400, the audio generation circuitry 406 may incorporate special-purpose hardware, such as a pulse width modulator (PWM) circuit, to facilitate the generation of frequencies or tones that constitute each audible signal 412. Such circuitry may then reduce the amount of processing power required of the control circuitry 408. In another example, such circuitry may be incorporated within a processor or related functional block of the control circuitry 408. In any of these scenarios, the control circuitry 408 may store data, such as frequencies to be used, lengths of time during which the signal 412 is to be presented, and related data for each audible signal 412, in data storage (not explicitly shown in FIG. 4). In one design, such data may be stored in memory incorporated within, or coupled with, the control circuitry 400. Also, the frequencies generated may range from 500 Hz (Hertz) to 2100 Hz in one example to accommodate a small speaker. To produce such frequencies, the control circuitry 408 may access a stored value indicative of the period for each of the unique audible signals, and load that value into the PWM or similar circuit to generate the audible signal 412.

In other arrangements, the remote control 400 may store a file for each of the audible signals 412, such as Waveform audio format (WAV) files. These files may be stored permanently in the remote control 400 by the manufacturer of the remote control 400, or may be added to the remote control 400 by the user by way of an audio input, such as a microphone, audio cable or the like (not depicted in FIG. 4). Use of such files may thereby allow more complex or distinctive audible signals 412 to be associated with each of the input components 402.

Aside from tones exhibiting varying frequencies, volumes, time lengths, and the like, another example of audible signals 412 used for identifying each input component 402 would be speech sounds. More specifically, each component 402 may be identified by an audible signal 412 that verbally announces the command or function associated with that component 402. For example, activation of the numeric key 312 for the number four may result in the spoken word "four" to be produced at the audio generation circuitry 606. Similarly, activation of one of the directional keys 308 may result in the generation of speech indicating the corresponding direction, such as "up" or "down". In one particular embodiment, the audio generation circuitry 606 may employ text-to-speech (TTS) software or hardware to facilitate generation of the audible signals 412.

Figure 6:
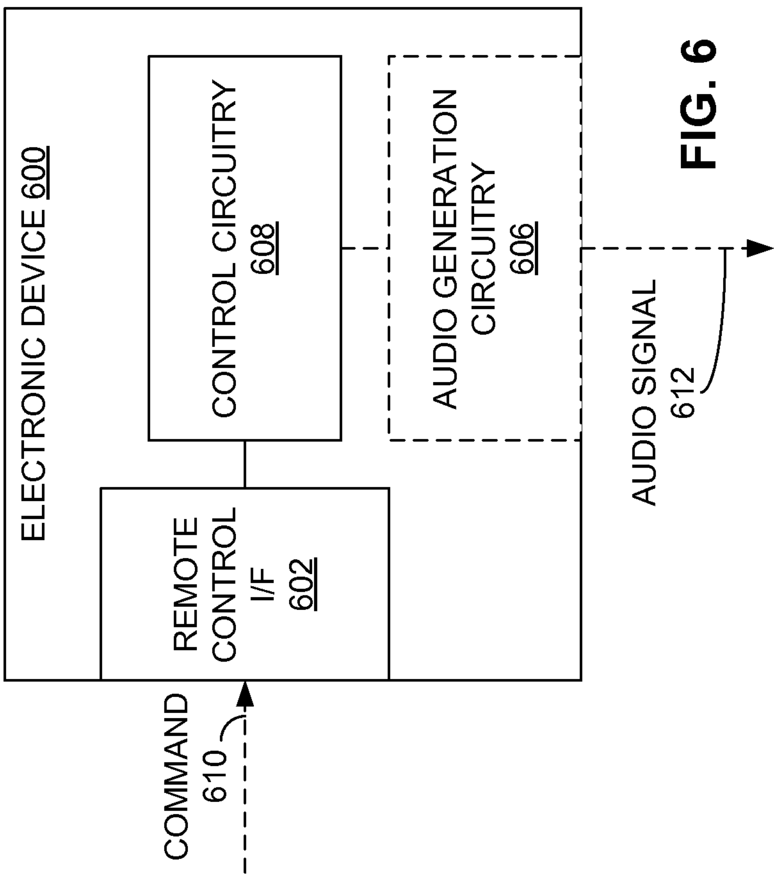
FIG. 6 is a block diagram of an electronic device according to an embodiment of the invention.

While the embodiments discussed in conjunction with FIGS. 4, 5A, and 5B employ the remote control device 400 exclusively for the determination and generation of the audible signals 412, other devices, such as an electronic device being controlled by the remote control device 400, may aid in these tasks. FIG. 6 provides a block diagram of such an electronic device 600 in one embodiment. The electronic device 600 may be any device configured to be controlled in such a fashion, including, but not limited to, a television, set-top box, audio receiver, DVR, CD or DVD player, desktop or laptop computer, and gaming system.

As shown in FIG. 6, the electronic device 600 includes a remote control interface 602 and control circuitry 608. Optionally, the electronic device 600 may include audio generation circuitry 606. Many other components, such as a power supply, user interface, one or more tuners, encoders, decoders, data storage devices, and the like, may also be incorporated within the electronic device 600, but such components are not discussed herein to simplify the following discussion.

The remote control interface 602 is configured to receive commands 610 from a remote control device, such as the remote control device 400 of FIG. 4. The commands 610 may be encoded as RF signals, IR signals, acoustic signals, or other wired or wireless signals. The remote control interface 602 may include receiver circuitry designed to receive one or more such signals and translate those signals into data understandable by the control circuitry 608.

The control circuitry 608 is configured to receive the command 610 for the electronic device from the remote control device via the remote control interface 602 and execute the command 610. The control circuitry 608 is also configured to determine an audio signal associated with the received command 610 and transfer the audio signal, which is to be presented to the user ultimately. As with the control circuitry 408 of FIG. 4, the remote control circuitry 608 may include one or more processors, such as a microprocessor, microcontroller, or DSP, configured to execute instructions directing the processor to perform the functions discussed below. The control circuitry 608 may also include memory or data storage adapted to contain such instructions. In another implementation, the control circuitry 608 may be strictly hardware-based logic, or may include a combination of hardware, firmware, and/or software elements.

Without the presence of the audio generation circuitry 606, the control circuitry 608 may transfer the audio signal 612 to another device coupled with the electronic device 600, which may in turn present the audio signal 612 in audible form to the user. For example, if the electronic device 600 is a television set-top box, the control circuitry 608 may transfer the audio signal 612 to a television or audio receiver, which may then convert the audio signal 612 into an audible signal by way of attached speakers for a user to hear. The transfer of the audio signal 612 from the electronic device 600 may occur by way of a number of audio signal connections, including, but not limited to, a High Definition Multimedia Interface (HDMI) connection, and a monaural or stereo analog audio connection. On the other hand, the electronic device 600, such as a television, may have one or more speakers, amplifiers, and associated circuitry constituting the audio generation circuitry 606. In that case, the control circuitry 608 transfers the audio signal 612 to the audio generation circuitry 606, which generates the audible form of the audio signal 612 for presentation to the user.

Figure 7A:
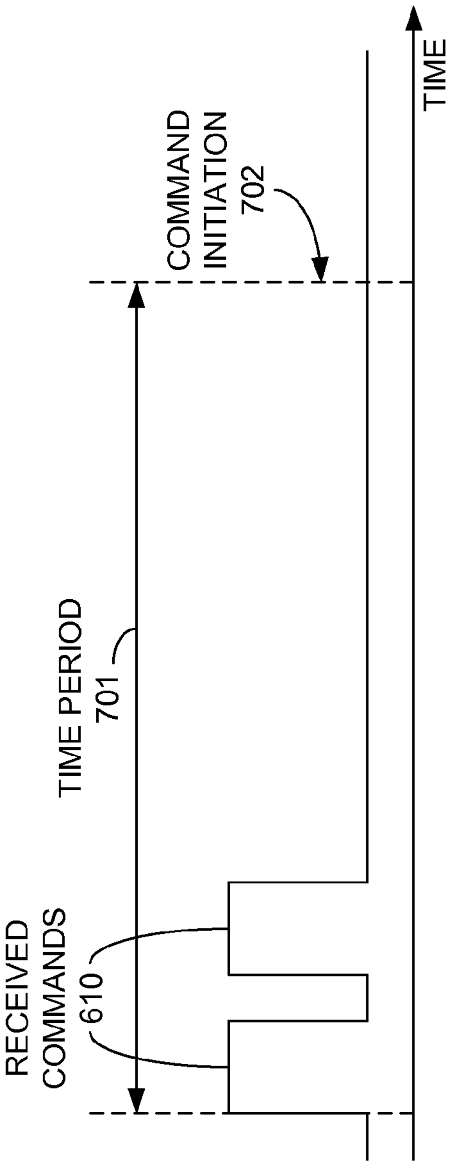
FIG. 7A is a timing diagram of a command initiation at the electronic device of FIG. 6 according to an embodiment of the invention.
Figure 7B:
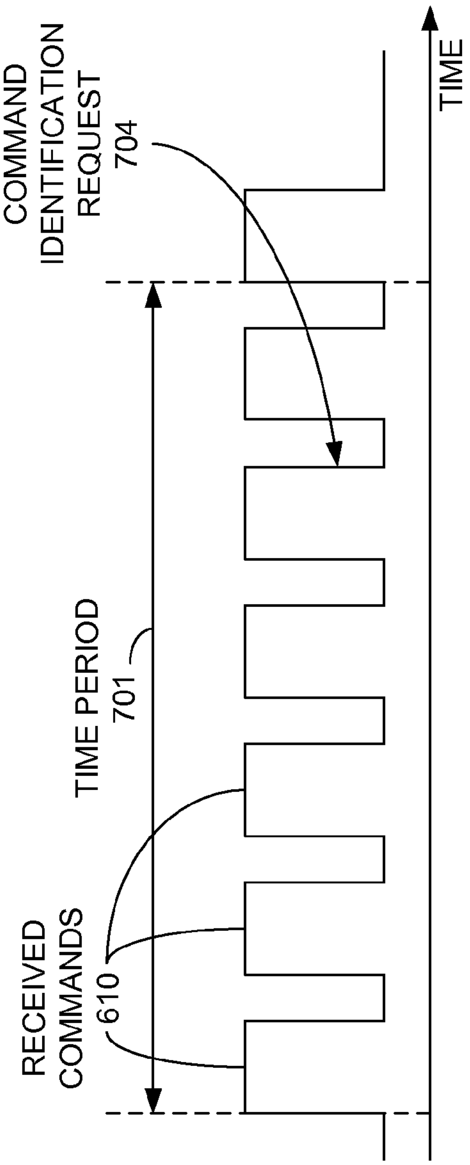
FIG. 7B is a timing diagram of a command identification request at the electronic device of FIG. 6 according to an embodiment of the invention.

Similar to the remote control device 400 of FIG. 4, the electronic device 600 may receive and execute the command 610, or determine and transfer the audio signal 612, or both, depending on one or more characteristics of the command 610 as received. For example, presuming that the remote control device repeatedly issues a command 610 associated with an activated input component as long as the component remains activated, the specific response of the control circuitry 608 to the command 610 may depend on the number of times the command 610 is received within a predetermined time period. For example, in FIG. 7A, a particular remote control command 610 is received twice within the predetermined time period 701. Since the number of times the command 610 is received is less than a predetermined threshold value (in this case, five) within the time period 701, the control circuitry 608 determines that the received command 610 should be executed. Oppositely, as shown in FIG. 7B, if the command 610 is received at least the threshold number of times (in this case, six altogether), the control circuitry 608 determines that an audible command identification request 704 is being received. In that case, the control circuitry 608 determines the audio signal 612 associated with the receiver command 610, and either presents the signal 612 to the user, or transfers the signal 612 to another electronic device for presentation, as mentioned above.

The various types of audio signals 612 possible, their relationship to the various commands 610 received, and other variations described above in conjunction with the remote control device 400 may be applied to the embodiments involving the electronic device 600 is various implementations. In such cases, these tasks may be controlled by way of the control circuitry 608 of the electronic device 600 instead of the control circuitry of the remote control providing the commands 610. One possible advantage of such an arrangement is that a typical electronic device 600 may more readily possess the necessary processing power and other resources, such as memory (not depicted explicitly in FIG. 6), that are necessary to support the above functionality without any additional enhancement in hardware.

At least some embodiments as described herein thus allow a user to identify various remote control input components, such as keys, buttons, switches, joysticks, touchpads, and the like, by way of sound, with or without actually invoking the commands associated without those components. This functionality, which may reside primarily in the remote control device or the electronic device being controlled thereby, addresses situations in which the user may not readily discern the remote control device components or associated functions by sight, such as in darkly lit rooms, or where markings on the remote control denoting the various components or functions are no longer viable.

While several embodiments of the invention have been discussed herein, other implementations encompassed by the scope of the invention are possible. For example, while various embodiments have been described within the context of a television set-top box and other entertainment electronics components, the design of other types of electronic systems and their associated remote control devices may be enhanced according the various inventive aspects described herein to similar benefit. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of informing a user of an identity of an input of a remote control device, the method comprising:

detecting user activation of one of a plurality of inputs of the remote control device for a period of time;

comparing the detected period of time with a time threshold;

in response to the detected period of time being longer than the time threshold, the method further comprising;

activating a function associated with the activated one of the plurality of inputs;

determining an audible signal associated with the activated one of the plurality of inputs, wherein each of the plurality of inputs of the remote control device is associated with a unique one of a plurality of audible signals; and producing the audible signal associated with the activated one of the plurality of inputs;

in response to the detected period of time being shorter than the time threshold, the method further comprising:

activating the function associated with the activated one of the plurality of inputs, wherein no audible signal is determined and produced when the detected period of time is shorter than the time threshold;

determining a functionality associated with the activated one of the plurality of inputs based upon a current operating mode of the activated one of the plurality of inputs, wherein the current operating mode specifies one of a first controlled device and a second controlled device that is currently controlled by the remote control device;

determining a first audible signal associated with the activated one of the plurality of inputs when the current operating mode controls the first controlled device;

emitting the first audible signal;

determining a second audible signal associated with the activated one of the plurality of inputs when the current operating mode controls the second controlled device, wherein the second audible signal is different from the first audible signal; and emitting the second audible signal.

2. A method of informing a user of an identity of an input of a remote control device, the method comprising:

detecting user activation of one of a plurality of inputs of the remote control device for a period of time;

comparing the detected period of time with a time threshold;

in response to the detected period of time being longer than the time threshold, the method further comprising:

activating a function associated with the activated one of the plurality of inputs;

determining an audible signal associated with the activated one of the plurality of inputs, wherein each of the plurality of inputs of the remote control device is associated with a unique one of a plurality of audible signals; and producing the audible signal associated with the activated one of the plurality of inputs;

in response to the detected period of time being shorter than the time threshold, the method further comprising:

activating the function associated with the activated one of the plurality of inputs, wherein no audible signal is determined and produced when the detected period of time is shorter than the time threshold;

determining a current operating mode of the remote control device that controls one of a first controlled device and a second controlled device;

determining an audio frequency associated with the activated one of the plurality of inputs;

emitting the audible signal for a first length of time at the audio frequency associated with the activated one of the plurality of inputs when the first controlled device is currently controlled; and emitting the audible signal for a second length of time at the audio frequency associated with the activated one of the plurality of inputs when the second controlled device is currently controlled, wherein the first length of time is used for other audible signals associated with other inputs on the remote control device when the first controlled device is controlled, and wherein the second length of time is used for the other audible signals associated with the other inputs on the remote control device when the second controlled device is controlled.

3. A method of informing a user of an identity of an input of a remote control device, the method comprising:

detecting user activation of one of a plurality of inputs of the remote control device for a period of time;

comparing the detected period of time with a time threshold;

in response to the detected period of time being longer than the time threshold, the method further comprising:

activating a function associated with the activated one of the plurality of inputs;

determining an audible signal associated with the activated one of the plurality of inputs, wherein each of the plurality of inputs of the remote control device is associated with a unique one of a plurality of audible signals; and producing the audible signal associated with the activated one of the plurality of inputs;

in response to the detected period of time being shorter than the time threshold, the method further comprising:

activating the function associated with the activated one of the plurality of inputs, wherein no audible signal is determined and produced when the detected period of time is shorter than the time threshold;

determining a current operating mode of the remote control device that controls one of a first controlled device and a second controlled device;

determining a first audio volume associated with the activated one of the plurality of inputs when the current operating mode controls the first controlled device;

emitting the audible signal at the first audio volume when the first controlled device is currently controlled;

determining a second audio volume associated with the activated one of the plurality of inputs when the current operating mode controls the second controlled device; and emitting the audible signal at the second audio volume when the second controlled device is currently controlled.

4. The method of claim 3, wherein the first audio volume is used for other audible signals associated with other inputs on the remote control device when the first controlled device is controlled, and wherein the second audio volume is used for the other audible signals associated with the other inputs on the remote control device when the second controlled device is controlled.

5. A method of informing a user of an identity of an input of a remote control device, the method comprising:

detecting user activation of one of a plurality of inputs of the remote control device for a period of time;

comparing the detected period of time with a time threshold;

in response to the detected period of time being longer than the time threshold, the method further comprising:

activating a function associated with the activated one of the plurality of inputs;

determining an audible signal associated with the activated one of the plurality of inputs, wherein each of the plurality of inputs of the remote control device is associated with a unique one of a plurality of audible signals; and producing the audible signal associated with the activated one of the plurality of inputs;

in response to the detected period of time being shorter than the time threshold, the method further comprising:

activating the function associated with the activated one of the plurality of inputs, wherein no audible signal is determined and produced when the detected period of time is shorter than the time threshold;

determining a current operating mode of the remote control device that controls one of a first controlled device and a second controlled device;

determining a first time period associated with the first controlled device;

determining a second time period associated with the second controlled device;

producing the audible signal for the first time period when the first controlled device is currently controlled; and producing the audible signal for the second time period when the second controlled device is currently controlled.

6. The method of claim 5, wherein the first time period for producing the audible signal is used for other audible signals associated with other inputs on the remote control device when the first controlled device is controlled, and wherein the second time period for producing the audible signal is used for the other audible signals associated with the other inputs on the remote control device when the second controlled device is controlled.

7. A method of informing a user of an identity of an input of a remote control device, the method comprising:

detecting user activation of one of a plurality of inputs of the remote control device for a period of time;

comparing the detected period of time with a time threshold;

in response to the detected period of time being longer than the time threshold, the method further comprising:

activating a function associated with the activated one of the plurality of inputs;

determining an audible signal associated with the activated one of the plurality of inputs, wherein each of the plurality of inputs of the remote control device is associated with a unique one of a plurality of audible signals; and producing the audible signal associated with the activated one of the plurality of inputs;

in response to the detected period of time being shorter than the time threshold, the method further comprising:

activating the function associated with the activated one of the plurality of inputs, wherein no audible signal is determined and produced when the detected period of time is shorter than the time threshold, wherein detecting the user activation of one of the plurality of inputs comprises: detecting contact with a touchpad, wherein:

a user touch on the touchpad defines activation of the touchpad;

a location of the user touch on the touchpad is defined by a horizontal position on the touchpad and a vertical position on the touchpad;

the audible signal is based on the horizontal position and the vertical position of activation of the touchpad;

a frequency of the audible signal is varied in accordance with the horizontal position of the user touch on the touchpad; and a volume of the audible signal is varied in accordance with the vertical position of the user touch on the touchpad.

8. A remote control device, comprising:

a plurality of user input components, wherein each of the user input components is associated with at least one command for an electronic device;

a transmitter configured to transmit commands to the electronic device;

audio generation circuitry configured to generate audio signals for a user; and control circuitry configured to:

detect a period of time of activation of one of the user input components;

generate a command for the electronic device based on the activated one of the user input components;

transfer the command to the transmitter for transmission to the electronic device;

compare the detected period of time of activation with a time threshold;

determine an audible signal associated with the activated one of the user input components in response to the detected period of time of activation being longer than the time threshold; and transfer the audible signal to the audio generation circuitry for generation for the user, wherein no audible signal is determined in response to the detected period of time of activation being shorter than the time threshold, wherein the plurality of user input components comprises a touchpad, wherein a user touch on the touchpad defines activation of the touchpad, wherein a location of the user touch on the touchpad is defined by a horizontal position on the touchpad and a vertical position on the touchpad;

wherein a frequency of the audible signal is varied in accordance with the horizontal position of the user touch on the touchpad; and wherein a volume of the audible signal is varied in accordance with the vertical position of the user touch on the touchpad.

9. An electronic device, comprising:

a remote control interface configured to receive commands for the electronic device from a remote control device, wherein user activation of one of a plurality of inputs of the remote control device is associated with a command, and wherein the command identifies one of a first controlled device and a second controlled device to be controlled in accordance with the command; and control circuitry configured to:

receive the command from the remote control device via the remote control interface;

execute the command to control the identified one of the first controlled device and the second controlled device;

determine an audio signal associated with the command, wherein the audio signal is associated with a first time period when the first controlled device is identified, and wherein the audio signal is associated with a second time period when the second controlled device is identified; and transfer the audio signal for generation for a user, wherein the audio signal is transferred for the first time period when the first controlled device is identified, and wherein the audio signal is transferred for the second time period when the second controlled device is identified.

10. The electronic device of claim 9, wherein the control circuitry is configured to:

execute the command if the command is not received more than a predetermined number of times from the remote control device during a predetermined time period; and determine and generate the audio signal if the command is received more than the predetermined number of times from the remote control device during the predetermined time period.

11. The electronic device of claim 9, wherein the electronic device further comprises:

audio generation circuitry configured to generate the audio signal transferred from the control circuitry for presentation to the user.

12. The electronic device of claim 9, wherein the electronic device is the first controlled device.

* * * * *